Oct. 10, 1950   B. N. ASHTON   2,524,951
CHECK VALVE
Filed Oct. 20, 1943

INVENTOR.
Benjamin N. Ashton
BY
Hoguet, Neary & Campbell
ATTORNEYS

Patented Oct. 10, 1950

2,524,951

UNITED STATES PATENT OFFICE 2,524,951

CHECK VALVE

Benjamin N. Ashton, Kingston, N. Y., assignor to Electrol Incorporated, Kingston, N. Y., a corporation of Delaware Application October 20, 1943, Serial No. 506,948

3 Claims. (Cl. 251—144)

1

This invention relates to improvements in valves and relates particularly to an improved form of check valve of a type suitable for use in liquid-distributing or hydraulic systems.

An object of the invention is to provide a simple form of check valve including a relatively small number of parts which provide an effective seal without requiring a precision fit between the valve elements.

A further object of the invention is to provide a check valve in which an effective seal is obtained by means of a supplemental sealing member which is deformable under pressure to compensate for any lack of precision fit between a valve plug and its seat.

Other objects of the invention will become apparent from the following description of a typical form of valve embodying the present invention.

In accordance with the present invention, I have provided a valve construction which is characterized by a valve plug having a substantially flat face portion that cooperates with a substantially flat annular valve seat and a deformable rubbery ring member adjacent to the seat to provide a fluid-tight seal.

More particularly, the preferred form of valve includes a generally tubular casing having fluid passages at opposite ends, a chamber therebetween and a shoulder portion at the junction of the chamber and one of the passages which is provided with an annular groove. The portion of the shoulder between the passageway and the groove forms an annular valve seat normal to the axis of the chamber that cooperates with a valve plug of generally disc-like formation having a flat surface portion that overlies the annular valve seat, and at least a portion of the groove around the valve seat. A rubbery toroidal ring is disposed in the groove and is of sufficient thickness to project slightly above the surface of the valve seat so that when the valve plug engages the valve seat the rubbery ring is compressed slightly.

When fluid pressure is exerted on the back of the valve plug, it is forced tightly down against the valve seat, but not necessarily into sealing engagement therewith. At the same time the fluid pressure acts upon the rubbery ring to deform it slightly and compress it inwardly toward the passageway. The fluid pressure acting upon the rubbery ring tends to unseat the valve plug, but can only compress the rubbery ring into tighter sealing engagement inasmuch as the area of the valve plug exposed to the fluid pressure is larger than the area of the ring exposed to the fluid pressure.

2

The above-described valve construction, therefore, is leak-proof under substantially all conditions of pressure and may be used successfully in high pressure hydraulic systems.

For a better understanding of the present invention, reference may be had to the accompanying drawing, in which.

Figure 1:
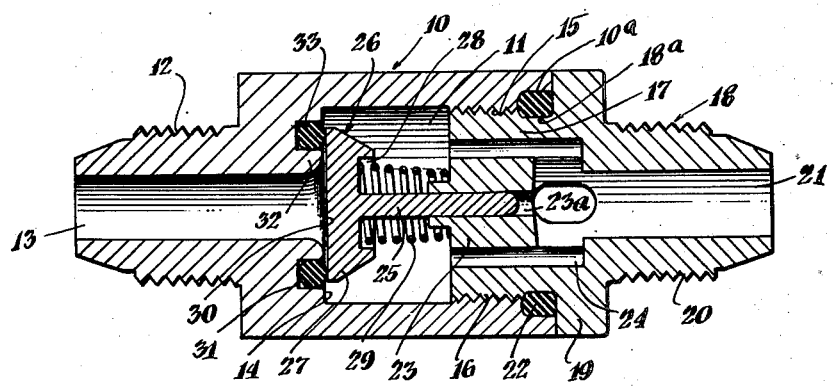
Figure 1 is a view in longitudinal cross-section of a typical form of check valve embodying the present invention.

The form of check valve chosen for purposes of illustration and disclosed in the accompanying drawings includes a tubular valve casing section 10 having a cylindrical cavity 11 therein and a threaded coupling 12 at one end thereof. The coupling 12 is provided with a central bore 13 of smaller diameter than the diameter of the chamber 11, thereby providing a shoulder 14 within the casing section 10 disposed substantially normal to the axis of the casing 10.

The right hand end of the casing section 10, as viewed in Figure 1, is provided with internal threads 15 which engage the threads 16 on a generally cylindrical portion 17 of the casing section 18. The casing section 18 is provided with a flange 19, preferably of polygonal or nut-like shape, permitting the sections 10 and 18 to be screwed together until the flange 19 engages the end of the casing section 10. The casing section 18 includes a threaded coupling 20 at its right hand end which is provided with a fluid passage 21.

The casing sections 10 and 18 may be provided with opposed grooves 10a and 18a for receiving a rubbery sealing ring 22 to prevent leakage between their threaded portions. A spider 23 is formed in the casing section 18 by drilling a plurality of holes or passages 24 inwardly from the left hand end in such positions that they are spaced apart, but intersect the passage 21, thereby connecting the passage 21 to the chamber 11.

The spider 23 is provided with a central passage 23a which receives the stem 25 on a valve member 26. The valve member 26 is provided with a generally disk-like valve plug or head 27 of somewhat smaller diameter than the chamber 11, having an annular recess 28 therein for receiving one end of a spring 29 which bears against the spider 23 and normally urges the valve member 26 to the left, as viewed in Figure 1. The valve plug 27 is provided with a substantially flat face 30 as illustrated, or a flat rim portion extending from the periphery of the plug 27 inwardly to about the periphery of the passage 13.

The shoulder 14 in the valve casing is provided with an annular groove 31 spaced from, but substantially concentric with the passage 13 in order to provide a flange or rim 32 which forms the seat for the valve plug 27. The seat 32 may have a substantially flat annular surface, but is not necessarily machined to fit precisely against the flat surface 30 of the valve plug. The cooperating surfaces of the plug and the seat normally do not provide an adequate seal to prevent leakage of liquid therebetween.

In order to produce an effective seal, a toroidal ring 33, formed of vulcanized natural rubber, synthetic rubber, a rubbery synthetic resin or other similar rubbery material, is disposed in the groove 31. Preferably the thickness of the ring 33 is somewhat greater than the depth and width of the groove 31 so that the ring 33 will be retained frictionally in the groove and will project slightly above the valve seat 32, as best shown in Figure 2.

Figure 2:
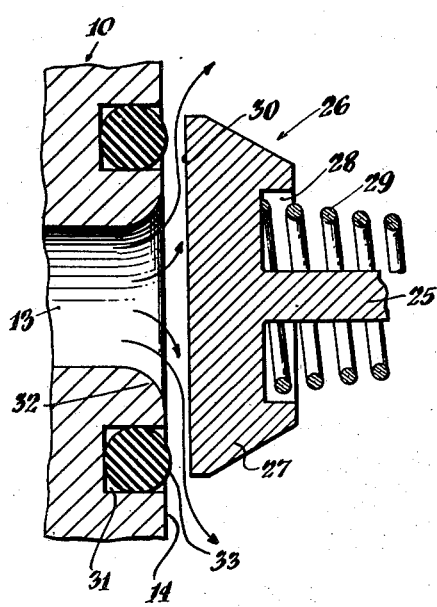
Figure 2 is a view in cross-section, and partly broken away, and somewhat enlarged in order to show details of construction and illustrating the valve plug displaced from its seat.
Figure 3:
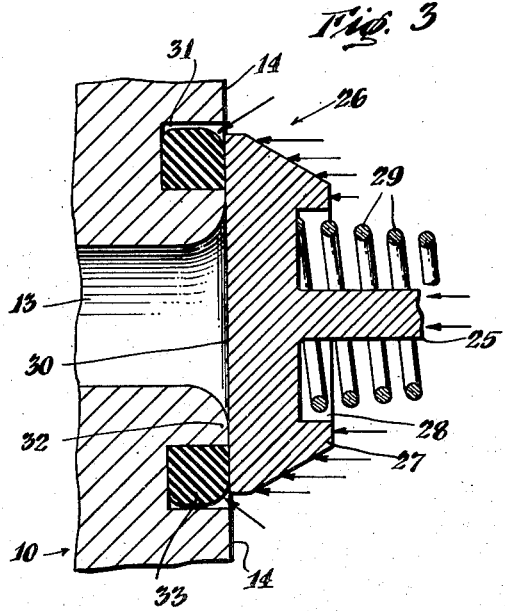
Figure 3 is a view similar to Figure 2, showing the valve seated against its seat and sealed against passage of fluid between the plug and the seat.

The operation of the rubbery ring 33 in effecting a seal between the valve plug and the shoulder 14 is best illustrated in Figures 2 and 3. When fluid passes from the passageway 13 toward the passageway 21, the pressure of the fluid or liquid upon the valve plug 27 will displace it to the right against the action of the spring 29.

When the fluid is static, the spring 29 will urge the plug 27 against the exposed portion of the rubbery ring 33, effecting a light seal therebetween. As the fluid pressure increases in the direction of the arrows in Figure 3, it will act upon the right hand surface of the valve plug 27, and will force the plug 27 tightly against the seat 32, thereby slightly compressing the rubbery ring 33. Inasmuch as the valve plug does not completely cover the groove 31 or seal it against the entry of fluid, the fluid pressure will act on the ring 33 in the direction of the inclined arrows, thereby compressing it tightly against the inner wall and bottom of the groove 31 and urging it against the edge of the valve plug 27, thereby tending to displace the latter from the seat 32. However, the area of the valve plug 27 exposed to the fluid pressure in the direction of the arrows greatly exceeds the area of the ring 33 exposed to the fluid pressure and, as a result, the ring 33 cannot react against the plug with sufficient force to displace the latter from the seat 32. The effect of the fluid acting upon the rubbery ring 33, therefore, is to press the ring 33 tightly against the valve plug 27 and against the bottom and the inner wall of the groove 31 and thereby providing a strong and effective seal between the plug 27, the ring 33 and the walls and bottom of the groove 31.

A particular advantage of valves of the type described above is that they may be produced of various types of materials not found suitable heretofore for valves capable of withstanding high pressures without leaking. For example, the valve including the seat and the plug may be formed of aluminum, magnesium, suitable plastics or other materials which are not hard enough to maintain a precision fit under the conditions to which valves are subjected. Moreover, the valve may be produced with relatively simple machinery and without expensive and time consuming honing and grinding operations. As a result, valves of the type embodying the present invention can be manufactured at relatively low cost and in a minimum amount of time.

It will be understood that valves of the type embodying the present invention are susceptible to considerable modification in the size, shape and number of parts without departing from the invention. Accordingly, it will be understood that the above-described form of valve is illustrative of the invention and should not be considered as limiting the scope of the following claims.

I claim:

1. A valve comprising a tubular valve casing having a fluid passage at one end, a centrally disposed chamber larger than said passage, an annular shoulder between said chamber and said passage, and another passage at its opposite end, means forming an annular groove in said shoulder facing said another passage and defining a plane annular valve seat between the first-mentioned passage and said groove, a rubbery ring in and projecting slightly from said groove, a valve plug in said chamber having a substantially flat face portion overlying said valve seat and extending partially across said groove to provide a gap for entry of fluid into said groove when said plug is in engagement with said seat, and means supporting said plug for movement toward and away from said seat, whereby said face portion is engageable with said seat and said ring, and the latter is deformable by fluid pressure to effect a seal between said valve plug and the means forming said groove.

2. A valve comprising a hollow valve casing having a fluid passage therethrough, an annular valve seat encircling a portion of, and having a flat face portion lying in a plane normal to said passage, means forming an annular groove extending circumferentially around the outer periphery of said flat face portion, a valve member mounted in said casing for movement toward and away from said valve seat, said valve member having a flat face portion overlying said valve seat extending partially across said groove, and a rubbery toroidal ring in and of slightly greater thickness than the depth of said groove, said face portions of said valve member and said seat being engageable under light pressure and said ring being engageable with said face portion of said valve member and deformable under fluid pressure applied directly to said ring to effect a seal between said seat and said valve member.

3. A valve comprising a first tubular valve casing section having a central fluid passage, an annular shoulder intermediate the ends of said central fluid passage, means forming an annular groove in said shoulder concentric with said passage, the portion of said shoulder lying between the groove and passage forming a plane annular valve seat, a rubbery toroidal ring in and projecting slightly from said groove, a second casing section threaded into one end of said first casing section having a substantially axial passage extending partially therethrough, the inner end of said second casing section being spaced from said valve seat, a valve member comprising a stem and a plug having a flat disc-like face opposed to said seat and partially overlying said groove to engage said ring and provide a gap for entry of fluid into said groove, a bore of smaller diameter than said axial passage extending axially of said second casing section for receiving said stem for axial sliding movement, at least one bore spaced radially from the axis of said second casing section communicating with the passage in the latter and with the interior of said first casing section, and spring means engaging the inner end of said second casing section and said valve member for urging said flat face of said valve member toward said valve seat and into engagement with said ring.

BENJAMIN N. ASHTON.

REFERENCES CITED

The following references are of record in the file of this patent:

UNITED STATES PATENTS

| Number | Name | Date |
|---|---|---|
| 141,747 | Armstrong | Aug. 12, 1873 |
| 584,146 | Hardie | June 8, 1897 |
| 874,652 | Bailey | Dec. 24, 1907 |
| 1,072,673 | Thelen | Sept. 9, 1913 |
| 1,077,415 | Massey | Nov. 4, 1913 |
| 1,161,257 | Scoville | Nov. 23, 1915 |
| 1,187,537 | Loomis | June 20, 1916 |
| 1,947,071 | Walton | Feb. 13, 1934 |
| 1,966,264 | Roye | July 10, 1934 |
| 2,083,584 | Wineman | June 15, 1937 |
| 2,268,119 | Honsteller | Dec. 30, 1941 |
| 2,316,480 | White | Apr. 13, 1943 |

FOREIGN PATENTS

| Number | Country | Date |
|---|---|---|
| 38 | Great Britain | Jan. 5, 1870 |
| 107 | Great Britain | Jan. 14, 1869 |
| 40,549 | Germany | of 1887 |
| 189,740 | Switzerland | May 18, 1937 |